US00RE43071E

(19) United States
(12) Reissued Patent
Gerendai et al.

(10) Patent Number: US RE43,071 E
(45) Date of Reissued Patent: Jan. 3, 2012

(54) DATA TRANSMISSION

(75) Inventors: Magdolna Gerendai, Budapest (HU); Mihaly Toth, Budapest (HU); Tamas Szabo, Budapest (HU)

(73) Assignee: Nokia Corporation, Espoo (FI)

(21) Appl. No.: 11/224,718

(22) Filed: Sep. 12, 2005

Related U.S. Patent Documents

Reissue of:
(64) Patent No.: 6,629,285
Issued: Sep. 30, 2003
Appl. No.: 09/477,457
Filed: Jan. 4, 2000

(51) Int. Cl.
*H04L 1/16* (2006.01)
(52) U.S. Cl. ..... 714/748
(58) Field of Classification Search ..... 714/748, 714/749
See application file for complete search history.

(56) References Cited

U.S. PATENT DOCUMENTS

| | | | |
|---|---|---|---|
| 5,130,986 | A | 7/1992 | Doshi et al. |
| 5,222,061 | A | 6/1993 | Doshi et al. |
| 5,664,091 | A | 9/1997 | Keen |
| 5,677,918 | A | 10/1997 | Tran et al. |
| 6,018,516 | A | 1/2000 | Packer |
| 6,105,064 | A | 8/2000 | Davis et al. |
| 6,335,933 | B1 | 1/2002 | Mallory |
| 6,392,993 | B1 | 5/2002 | Hamilton et al. |

FOREIGN PATENT DOCUMENTS

| | | | |
|---|---|---|---|
| EP | 0 695 053 | A2 | 7/1995 |
| EP | 0695 053 | A2 | 1/1996 |
| GB | 2 318 036 | A | 4/1998 |

*Primary Examiner* — Stephen M Baker
(74) *Attorney, Agent, or Firm* — Hollingsworth & Funk, LLC

(57) ABSTRACT

A method and system for large data transfer between a sender and a receiver. The sender transmits to the receiver a plurality of data packets in sequence. The time elapsed for each of the plurality of data packets after transmission of said each of the plurality of data packets is determined. The receiver transmits a message from the receiver to the sender notifying the sender that an identified one of the plurality of the data packets is missing. The sender retransmits to the receiver the identified one of the plurality of data packets only when the elapsed time determined for the identified one of the plurality of the data packets is greater than a predetermined time interval.

31 Claims, 3 Drawing Sheets

DATA TRANSMISSION

Matter enclosed in heavy brackets [ ] appears in the original patent but forms no part of this reissue specification; matter printed in italics indicates the additions made by reissue.

*CROSS-REFERENCE TO OTHER REISSUE APPLICATIONS*

*Notice: More than one reissue application has been filed for the reissue of U.S. Pat. No. 6,629,285. The reissue applications are U.S. application Ser. No. 11/224,718 (the present application), and Ser. No. 12/393,589 which is a divisional reissue of U.S. Pat. No. 6,629,285.*

BACKGROUND OF THE INVENTION

1. Field of the Invention

The present invention relates to data transmission in a wireless communication network and, more particularly, to a method and a system for transmitting data between a mobile station and a server in an efficient and reliable manner.

2. Description of the Related Art

The Wireless Application Protocol (WAP) has been developed to address the needs of the mobile stations as these devices have severe physical, memory and processing constraints. WAP is applicable to a number of different systems including GSM-900, GSM-1800, GSM-1900, CDMA IS-95, TDMA IS-136, wide-band IS-95 and third generation systems such as IMT-2000, UMTS and W-CDMA.

Pursuant to WAP, there are three classes of transactions: Class 0 for unreliable one way requests, Class 1 for reliable one-way requests, and Class 2 for reliable two-way request-response transactions. A transaction is defined as a unit of interaction between an "initiator" (e.g., a sender or a receiver) and a "responder" (e.g., a sender or a receiver). A transaction begins with an invoke message generated by the sender. In class 2 transactions, the receiver replies with one result message that implicitly acknowledges the invoke message. If the receiver takes longer than a specified time interval to service the invoke message, the receiver may reply with a "hold on" acknowledgement message before transmitting the result message so as to avoid the retransmission of the invoke message. The transaction ends when the sender receives the acknowledgement.

If the length of a message exceeds the maximum size specified by a bearer (e.g., a telephone company), then before the message is sent, it is segmented into an ordered sequence of data packets. Each data packet has a packet sequence number (PSN) assigned thereto. Thus, for example, the first segmented data packet is assigned a packet sequence number of zero, the second data packet is assigned a packet sequence number of one, the third data packet is assigned a packet sequence number of two, and so on. The data packets are transmitted individually or in groups, and then re-assembled by the receiver upon receipt. The maximum number of packets a message can be segmented is about 256 packets, each packet having a maximum size of 1 to 2 Kbytes. Thus, the maximum size of a message is typically less than 0.5 Mbytes.

In the case where the data packets are segmented into groups, the sender does not send any new packets belonging to the same transaction until receipt of the previous packet groups has been acknowledged. In other words, packet groups are sent according to a stop-and-wait protocol. Typically, the sender determines the number of packets in each packet group and transmits the packets of a packet group in one batch. The last data packet of each packet group has a Group Trailer (GTR) flag set and is often referred to as the GTR packet. The last data packet of the last packet group of the entire message has the Transmission Trailer (TTR) flag set and is also referred to as the TTR packet. The receiver stores all packets received and upon receipt of the GTR packet, the receiver checks whether it has received all packets belonging to that particular packet group. If it has received all of the packets in that group, the receiver returns an acknowledgement message containing the packet sequence number of that GTR packet. If, however, the GTR or TTR packet is received and one or more packets of the packet group are missing, the receiver waits for a period of time, e.g., ½ the median round-trip time (RTT), before transmitting a negative acknowledgement (NACK) message containing the packet sequence numbers of the missing packets of that particular packet group. If the sender does not receive an acknowledgement within a specified time interval after transmission of a packet group, it retransmits only the GTR or TTR packet of that packet group to the receiver.

Problems arise, however, as one or more of the acknowledgement or negative acknowledgement messages are lost during transmission due to, for example, handover errors or congestion in the wireless communication network, thereby resulting in the retransmission of data packets that the receiver has already received.

SUMMARY OF THE INVENTION

An object of the present invention is to provide a more robust method and system of transmission of data.

According to one aspect of the invention, a receiver transmits a negative acknowledgement message to a sender listing all previously missing data packets of a data message. The receiver implicitly acknowledges received data packets by not listing them in the negative acknowledgement message.

According to another aspect of the invention, the sender retransmits a data packet only if the time elapsed after the original transmission of that data packet is greater than a predetermined time period.

In one embodiment, the sender transmits to the receiver a plurality of data packets in sequence. The time elapsed for each of the plurality of data packets after transmission of said each of the plurality of data packets is determined. The receiver transmits a message from the receiver to the sender notifying the sender that an identified one of the plurality of the data packets is missing. The sender retransmits to the receiver the identified one of the plurality of data packets only when the elapsed time determined for the identified one of the plurality of the data packets is greater than a predetermined time interval.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements.

DETAILED DESCRIPTION OF THE PRESENTLY PREFERRED EMBODIMENTS

Finnish Patent Application No. 999470, filed on Nov. 17, 1999 and assigned to the assignee hereof, is incorporated herein by reference. That application discloses a new class of data transmission for the WAP standard, in particular, for transmission of a data message of an arbitrary length.

Figure 1:
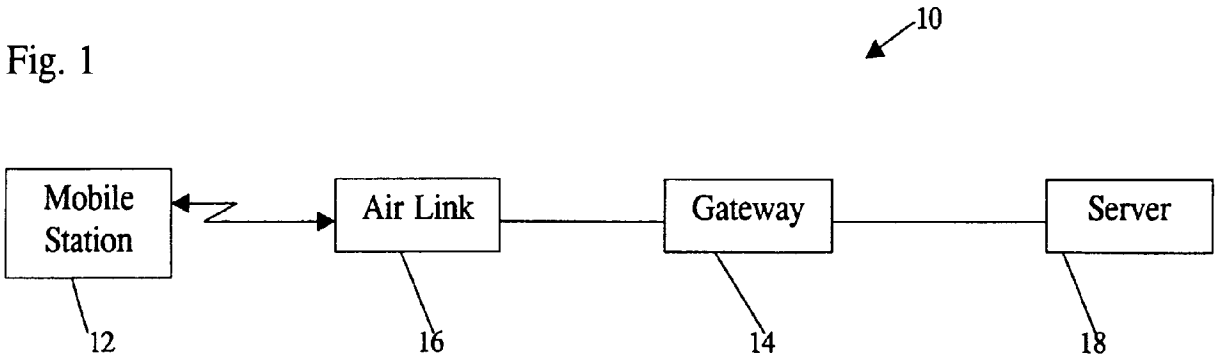
FIG. 1 is a block diagram of a data transmission system configured in accordance with an embodiment of the present invention.

FIG. 1 diagrammatically illustrates an exemplary data transmission system 10 comprising a mobile station 12 (e.g., a cellular phone) in wireless communication with a gateway 14, through an air link 16 (that includes, for example, a base station and a switching control point). The gateway 14 is connected to a server 18 through a wide area network such as, for example, the Internet or Intranet. Data is transmitted to and from the mobile station 12 in accordance with the inventive method described below.

Figure 2:
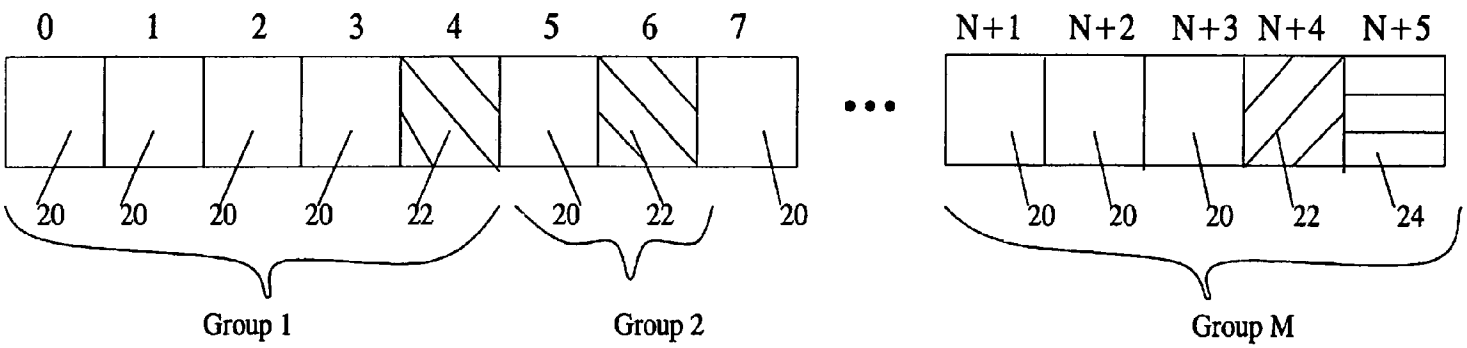
FIG. 2 is a segmented data message transmitted in the system of FIG. 1.

FIG. 2 diagrammatically illustrates a segmented data message of a data stream. The data message comprises a plurality of data packet groups. Each group comprises one or more data packets 20 with no flag sets and a data packet 22 with a GTR flag set. The GTR flag set indicates the last data packet of a data packet group. The last data packet 24 of the entire data message includes a TTR flag set. Each data packet 20 of a data message is associated with a unique identification number, e.g., a packet sequence number (PSN) so that a receiver (e.g., mobile station 12) can identify a missing data packet of the data message on the basis of the identification numbers. Preferably, the data packets are numbered consecutively (e.g., 0, 1, 2, 3 . . . ).

In one embodiment, a sender (e.g. gateway 14 or server 18) transmits to the receiver the data packets 20 sequentially in accordance with the PSNs so that a data packet 20 with a lower PSN is transmitted prior to one with a higher PSN (e.g., a data packet with PSN=2 is transmitted before a data packet with PSN=3). If the receiver determines that a data packet 20 is missing (e.g., it has received data packet with PSN=3 but not PSN=1), it transmits to the sender a negative acknowledgement (NACK) message listing the missing packet (e.g., PSN =1). Preferably, the NACK message lists not only the missing packet(s) of the most current data packet group but also the missing packet(s) of all previous data packet groups. Thus, if a data packet with PSN=3 is missing from packet group 1 (and not yet received) and data packet with PSN=25 is missing from packet group 5, the NACK message will list both missing data packets (PSN=3 and PSN=25). This is particularly advantageous because even if the previous NACK message is lost, the sender will still be notified of the missing data packet(s) of previously sent packet groups. It is contemplated that the NACK message may be sent before or after the receiver receives a GTR data packet of each data packet group.

After receiving a NACK message from the receiver, the sender checks the time elapsed since the transmission of each missing data packet listed in the NACK message. If the elapsed time for a missing data packet is less than a predetermined time interval (e.g., about one round trip time (RTT) for a data packet to travel between the sender and the receiver), the sender does not retransmit the requested (missing) data packet. On the other hand, if the elapsed time for the missing data packet is greater than the predetermined time interval, then the sender retransmits the missing data packet.

Upon receipt of all data packets in a group, the receiver transmits an acknowledgement (ACK) message to the sender acknowledging receipt of all data packets for a group and then begins assembling the received data packets so as to reconstruct the data message. Similar to the transmission of NACK messages, the receiver may transmit an ACK message after receipt of the GTR data packet of a group. The receiver may also transmit an ACK message acknowledging receipt of all data packets of a data message after receipt of the TTR data packet. Alternatively, the receiver may transmit a NACK message listing no missing data packets for a particular group to thereby implicitly acknowledge receipt of all data packets in that particular group.

In a particularly preferred embodiment, a NACK message lists not only the missing data packets, but also the highest packet sequence number of the data packets received by the receiver. Using such a NACK message, the receiver can thus implicitly acknowledge receipt of all data packets with lower PSNs (except for the listed missing packets). An example illustrating this NACK message is as follows. A sender transmits two groups of data packets: packets with PSN=N, N+1, N+2(GTR); and packets with PSN=N+3, N+4, N+5(GTR). The data packets with PSN=N+2 and N+5 include the GTR flag sets and are thus the last data packets in their respective groups. The data packets with PSN=N and N+1 are lost during transmission. The receiver then transmits a NACK message (NACK_1) listing data packets with PSN=N and N+1 as missing and data packet with PSN=N+2 as the last data packet (i.e., with the highest PSN) received by the receiver. NACK_1, however, is also lost during transmission. Meanwhile, the receiver continues to receive data packets of the next packet group: data packets with PSN=N+3, N+4, and N+5. After determining data packets with PSN=N and N+1 are still missing, the receiver transmits a second NACK message (NACK_2) listing the last data packet received (e.g., data packet with PSN=N+5) and the still missing data packets (data packets with PSN=N and N+1). The sender receives NACK_2 and recognizes that the receiver has received all data packets in the two groups of data packets, except data packets with PSN=N and N+1. The sender thereafter resends the missing data packets (PSN=N and N+1). It is contemplated that this NACK message may be used in combination with an acknowledgement message to further enhance reliability of communication between the sender and the receiver.

Figure 3:
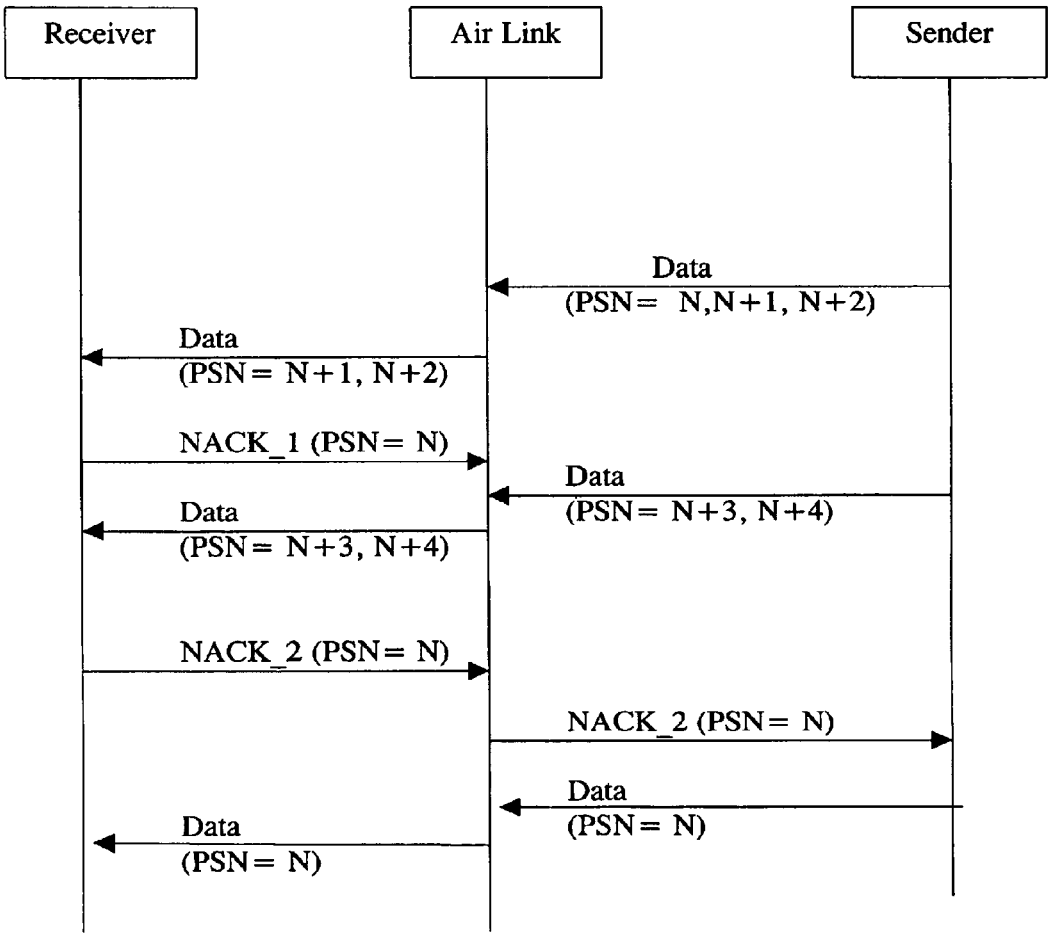
FIG. 3 is a message sequence diagram in accordance with one embodiment of the inventive method.

FIG. 3 illustrates the steps of one embodiment of the inventive method. A receiver transmits a data request to the air link 16, which in turn transmits the request to a sender. The sender receives the data request and transmits to the air link 16 data packets 20 with PSN=N, N+1, and N+2. The air link then transmits only data packets with PSN=N+1 and N+2 and loses the data packet 20 with PSN=N. The receiver determines that data packet with PSN=N is missing and transmits to the air link 16 a NACK message (NACK_1) listing the data packet with PSN=N. But the NACK message is also lost and the air link 16 fails to forward the NACK message to the sender. The sender, still responding to the original data request, sends data packets 20 with PSN=N+3 and N+4 of another packet group. The air link 16 transmits to the receiver the data packets with PSN=N+3 and N+4. The receiver determines again that the data packet PSN=N is missing and sends another NACK message (NACK_2) listing the missing data packet to the air link 16, which successfully forwards the NACK_2 message to the sender. In response to NACK_2, the sender transmits the missing data packet with PSN=N to the receiver through the air link 16.

Figure 4:
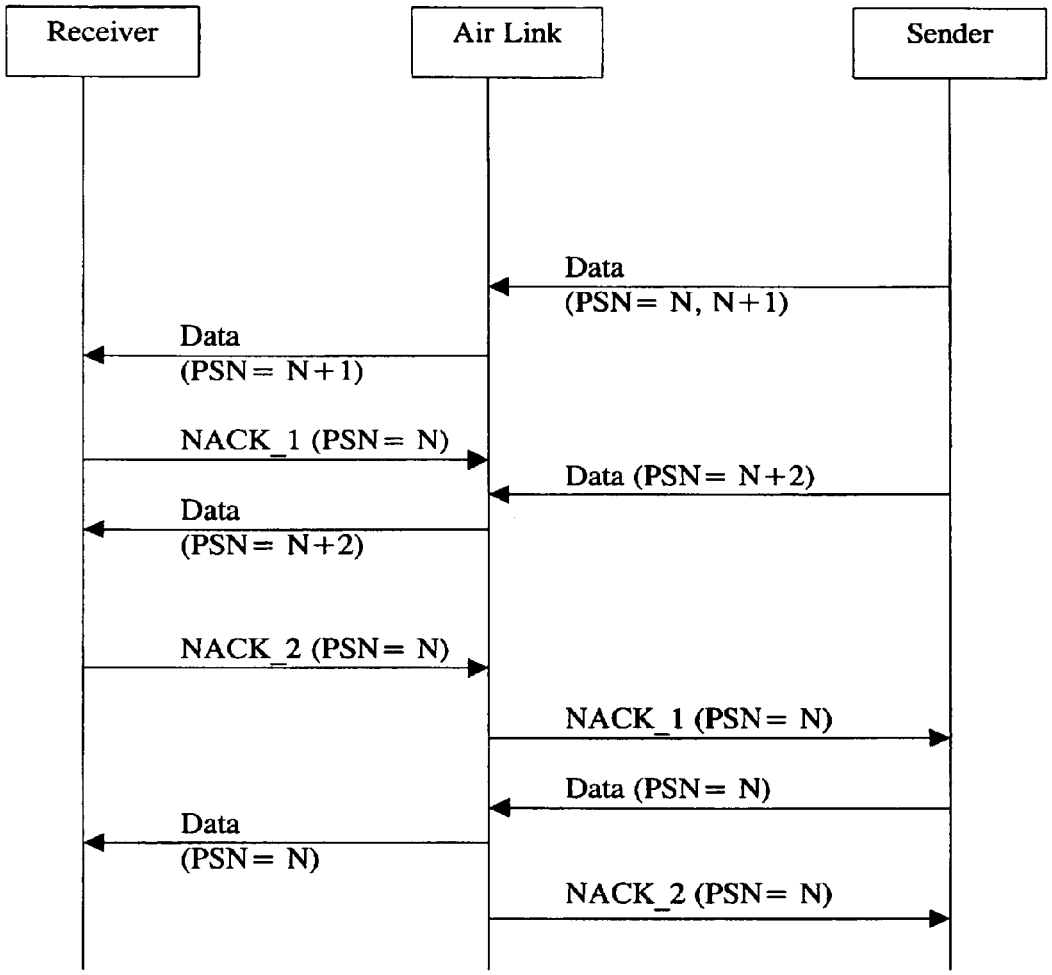
FIG. 4 is a message sequence diagram in accordance with another embodiment of the inventive method.

FIG. 4 illustrates another embodiment of the inventive method. The receiver transmits a request for data to the air link 16, which in turn transmits the request to the sender. The sender then sends the data packets with PSN=N, N+1 to the air link 16. The air link loses data packet with PSN=N and transfers only data packet with PSN=N+1 to the receiver. The receiver transmits to the air link 16 a negative acknowledgement message (NACK_1) listing data packet with PSN=N. The sender continues to send data packet with PSN=N+2 to the air link 16, which successfully transmits the data packet to the receiver. The receiver determines (before or after receipt of a GTR packet) data packet with PSN=N is missing and thereafter transmits another negative acknowledge message (NACK_2). However, the air link finally transmits NACK_1 to the sender, which responds by sending the data packet with PSN=N to the air link 16. The air link 16 transfers the data packet with PSN=N to the receiver. After the sender transmits the data packet (PSN=N) within a time interval less than one RTT (i.e., the predetermined time interval), the sender receives NACK_2 requesting the same data packet (i.e., PSN=N). Since NACK_2 was received within a time interval less than one RTT, the sender ignores NACK_2 and refuses to send the requested data packet.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of transmitting data between a sender and a receiver, comprising in sequence the steps of:

(a) transmitting a data message containing a plurality of data packets in sequence from the sender to the receiver in response to a request, the data packets being transmitted in groups of data packets, each of the groups having at least one data packet, wherein the last data packet of each group comprises an end of group flag for indicating the last data packet of each groups and the last data packet of the data message comprises an end of message flag for indicating the last data packet of the data message;

(b) determining time elapsed for each of the plurality of data packets after transmission of said each of the plurality of data packets;

(c) determining by the receiver whether any of the plurality of data packets is missing;

(d) transmitting a message from the receiver to the sender notifying the sender that an identified one of the plurality of the data packets is missing when the receiver has determined at least one of the plurality of data packets is missing; and (e) retransmitting from the sender to the receiver the identified one of the plurality of data packets only when the elapsed time determined for the identified one of the plurality of the data packets is greater than a predetermined time interval.

2. The method of claim 1, wherein the predetermined time interval is about one round trip time for the identified one of the plurality of data packets to travel between the sender and the receiver.

3. The method of claim 1, wherein step (d) further comprises the step of notifying the sender of the last data packet received by the receiver.

4. The method of claim 1, wherein in step (d) the sender is notified of all missing data packets in all previously sent groups.

5. The method of claim 4, wherein missing data packets in all previously sent groups include newly identified missing data packets and previously identified missing data packets which remain missing.

6. The method of claim 1, further comprising the step of transmitting from the receiver an acknowledgement message for each group upon receipt of all data packets in said each group and upon receipt of all the data packets in the data message.

7. The method of claim 6, wherein the acknowledgement message is a negative acknowledgement message which lists no missing data packets, thereby implicitly acknowledging receipt of all data packets of the each group.

8. The method of claim 1, wherein each of the plurality of data packets of a data message is uniquely identified by a packet sequence number.

9. The method of claim 8, wherein the packet sequence numbers are arranged in consecutive order.

10. The method of claim 9, wherein step (d) further comprises the step of notifying the sender of the highest packet sequence number of the last data packet received by the receiver, thereby implicitly acknowledging receipt of all data packets having lower packet sequence numbers except for the at least one of the plurality of data packets that is identified as missing.

11. A system of transmitting data between a sender and a receiver, comprising:

(a) means for transmitting a data message containing a plurality of data packets in sequence from the sender to the receiver in response to a request, the data packets being arranged in groups of data packets, each of the groups having at least one data packet, wherein the last data packet of each group comprises an end of group flag for indicating the last data packet of each group and the last data packet of the data message comprises an end of message flag for indicating the last data packet of the data message;

(b) means for determining time elapsed for each of the plurality of data packets after transmission of said each of the plurality of data packets;

(c) means for determining by the receiver whether any of the plurality of data packets is missing;

(d) means for transmitting a message from the receiver to the sender notifying the sender that an identified one of the plurality of the data packets is missing when the receiver has determined at least one of the plurality of data packets is missing; and (e) means for transmitting from the sender to the receiver the identified one of the plurality of data packets only when the elapsed time determined for the identified one of the plurality of the data packets is greater than a predetermined time interval.

12. The system of claim 11, wherein the sender is one of gateway and a server.

13. The system of claim 11, wherein each of the plurality of data packets of a data message is uniquely identified by a packet sequence number arranged in consecutive order and said means transmitting a message further comprises means for notifying the sender of the highest packet sequence number of the last data packet received by the receiver, thereby implicitly acknowledging receipt of all data packets having lower packet sequence numbers except for the at least one of the plurality of data packets that is identified as missing.

14. The system of claim 11, wherein the receiver is a mobile station.

15. The system of claim 14, wherein said mobile station is a mobile phone.

16. The system of claim 11, further comprising means for transmitting from the receiver an acknowledgement message upon receipt of the end of all data packets in said each group and upon receipt of all the data packets in the data message.

17. The system of claim 16, wherein the acknowledgement message is a negative acknowledgement message which lists no missing data packets, thereby implicitly acknowledging receipt of all data packets of the each group.

18. The system of claim 11, wherein the sender is notified of all missing data packets in all previously sent groups.

19. The system of claim 18, wherein the missing data packets in all previously sent groups include newly identified missing data packets and previously identified missing data packets which remain missing.

*20. A sender for transmitting data to a receiver, said sender arranged and dimensioned for:*

*receiving from a receiver a request for data;*

*transmitting a data message containing a plurality of data packets to a receiver in response to the request, the data packets being arranged in groups of data packets, each of the groups having at least one data packet, wherein the last data packet of each group comprises an end of group flag for indicating the last data packet of each group and the last data packet of the data message comprises an end of message flag for indicating the last data packet of the data message;*

*determining time elapsed for each of the plurality of data packets after transmission of said each of the plurality of data packets;*

*receiving from the receiver a message indicating an identified one of the plurality of packets is missing; and*

*transmitting the identified one of the plurality of data packets to the receiver only when the elapsed time determined for the identified one of the plurality of data packets is greater than a predetermined time interval.*

*21. The sender of claim 20, wherein the sender is one of a gateway and a server.*

*22. The sender of claim 20, wherein the sender is a mobile station.*

*23. The sender of claim 20, wherein each of the plurality of data packets of a data message is uniquely identified by a packet sequence number arranged in consecutive order, said sender being further arranged and dimensioned for receiving a message indicating the highest packet sequence number of the last packet received by the receiver, and for considering all data packets having lower packet sequence numbers as received by the receiver except for the at least one of the plurality of data packets that is identified as missing.*

*24. In a sender for transmitting data to a receiver, a storage medium having an application program including instructions for performing the steps of:*

*receiving from a receiver a request for data;*

*transmitting a data message containing a plurality of data packets to a receiver in response to the request, the data packets being arranged in groups of data packets, each of the groups having at least one data packet, wherein the last data packet of each group comprises an end of group flag for indicating the last data packet of each group and the last data packet of the data message comprises an end of message flag for indicating the last data packet of the data message;*

*determining time elapsed for each of the plurality of data packets after transmission of said each of the plurality of data packets;*

*receiving from the receiver a message indicating an identified one of the plurality of packets is missing; and*

*transmitting the identified one of the plurality of data packets to the receiver only when the elapsed time determined for the identified one of the plurality of data packets is greater than a predetermined time interval.*

*25. The storage medium of claim 24, wherein the sender is a gateway and server.*

*26. The storage medium of claim 25, wherein the sender is a mobile phone.*

*27. The storage medium of claim 24, wherein each of the plurality of data packets of a data message is uniquely identified by a packet sequence number arranged in consecutive order, wherein the step of receiving a message further comprises receiving a message indicating the highest packet sequence number of the last packet received by the receiver, and considering all data packets having lower packet sequence numbers as received by the receiver except for the at least one of the plurality of data packets that is identified as missing.*

*28. A method for transmitting data from a sender to a receiver, comprising the steps of:*

*receiving from a receiver a request for data;*

*transmitting a data message containing a plurality of data packets to a receiver in response to the request, the data packets being arranged in groups of data packets, each of the groups having at least one data packet, wherein the last data packet of each group comprises an end of group flag for indicating the last data packet of each group and the last data packet of the data message comprises an end of message flag for indicating the last data packet of the data message;*

*determining time elapsed for each of the plurality of data packets after transmission of said each of the plurality of data packets;*

*receiving from the receiver a message indicating an identified one of the plurality of packets is missing; and*

*transmitting the identified one of the plurality of data packets to the receiver only when the elapsed time determined for the identified one of the plurality of data packets is greater than a predetermined time interval.*

*29. The method of claim 28, wherein each of the plurality of data packets of a data message is uniquely identified by a packet sequence number arranged in consecutive order, wherein the step of receiving a message further comprises receiving a message indicating the highest packet sequence number of the last packet received by the receiver, and considering all data packets having lower packet sequence numbers as received by the receiver except for the at least one of the plurality of data packets that is identified as missing.*

*30. The method of claim 28, wherein the sender is one of a gateway and server.*

*31. The method of claim 30, wherein the sender is a mobile phone.*

* * * * *